United States Patent
Xu

(10) Patent No.: US 11,315,265 B2
(45) Date of Patent: Apr. 26, 2022

(54) FINGERTIP DETECTION METHOD, FINGERTIP DETECTION DEVICE, AND MEDIUM

(71) Applicant: BOE TECHNOLOGY GROUP CO., LTD., Beijing (CN)

(72) Inventor: Chu Xu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/647,765

(22) PCT Filed: Jul. 4, 2019

(86) PCT No.: PCT/CN2019/094733
§ 371 (c)(1),
(2) Date: Mar. 16, 2020

(87) PCT Pub. No.: WO2020/048213
PCT Pub. Date: Mar. 12, 2020

(65) Prior Publication Data
US 2020/0286246 A1    Sep. 10, 2020

(30) Foreign Application Priority Data
Sep. 3, 2018    (CN) .................... 201811021272.4

(51) Int. Cl.
*G06K 9/00*    (2006.01)
*G06T 7/50*    (2017.01)
(Continued)

(52) U.S. Cl.
CPC .............. *G06T 7/50* (2017.01); *G06F 3/0426* (2013.01); *G06T 7/60* (2013.01); *G06T 2207/10028* (2013.01)

(58) Field of Classification Search
CPC ... G06T 7/50; G06T 7/60; G06T 2207/10028; G06F 3/0426
See application file for complete search history.

(56) References Cited

U.S. PATENT DOCUMENTS 8,913,037 B1 * 12/2014 Liu .................. H04N 5/74
345/175
9,189,855 B2 * 11/2015 Guigues ................ G06T 7/73
(Continued)

FOREIGN PATENT DOCUMENTS

CN    103226387 A  *  7/2013
CN    103226387 A     7/2013
(Continued)

OTHER PUBLICATIONS

Parsing the Hand in Depth Images, Hui Liang et al., IEEE, 1520-9210, 2014, pp. 1241-1253 (Year: 2014).*
(Continued)

*Primary Examiner* — Jayesh A Patel
(74) *Attorney, Agent, or Firm* — Collard & Roe, P.C.

(57) ABSTRACT

A fingertip detection method, a fingertip detection device and a storage medium are disclosed. The fingertip detection method includes: determining a minimum-depth point in a hand area to be detected based on a depth image; determining a hand vertex in the hand area to be detected based on the depth image; determining a fingertip position based on the minimum-depth point and the hand vertex.

16 Claims, 6 Drawing Sheets

(51) Int. Cl.
  *G06F 3/042* (2006.01)
  *G06T 7/60* (2017.01)

(56) References Cited

U.S. PATENT DOCUMENTS

| | | | |
|---|---|---|---|
| 9,483,835 B2* | 11/2016 | Liang | G06T 7/194 |
| 9,501,138 B2* | 11/2016 | Dal | G06F 3/04815 |
| 10,372,226 B2* | 8/2019 | Dai | G06F 3/017 |
| 2005/0271279 A1 | 12/2005 | Fujimura et al. | |
| 2012/0062736 A1* | 3/2012 | Xiong | G06K 9/00389 348/143 |
| 2015/0117708 A1* | 4/2015 | Guigues | G06T 7/246 382/103 |
| 2016/0078289 A1* | 3/2016 | Michel | G06K 9/00355 345/156 |
| 2016/0132121 A1* | 5/2016 | Murase | G06K 9/4604 345/156 |
| 2016/0209927 A1* | 7/2016 | Yamagishi | G06F 3/0304 |
| 2017/0024015 A1* | 1/2017 | Song | G06F 3/011 |
| 2017/0090584 A1* | 3/2017 | Tang | G06F 3/165 |
| 2017/0186165 A1* | 6/2017 | Taylor | G06T 7/75 |
| 2019/0188460 A1* | 6/2019 | Zhang | G06K 9/00355 |
| 2019/0392205 A1* | 12/2019 | Tang | G06T 7/246 |
| 2020/0401231 A1* | 12/2020 | Ahn | G06F 3/0304 |

FOREIGN PATENT DOCUMENTS

| | | | |
|---|---|---|---|
| CN | 103294996 A | 9/2013 | |
| WO | WO-2017134059 A1 * | 8/2017 | G06K 9/4628 |

OTHER PUBLICATIONS

Gesture Recognition and fingertip detection for Human Computer Interaction, R. Meena Prakash et al., IEEE, 978-1-5090-3294-5, 2017, pp. 1-4 (Year: 2017).*

International Search Report of PCT/CN2019/094733 in Chinese, dated Oct. 10, 2019, with English translation.

* cited by examiner

FINGERTIP DETECTION METHOD, FINGERTIP DETECTION DEVICE, AND MEDIUM

CROSS-REFERENCE TO RELATED APPLICATIONS

This application is the National Stage of PCT/CN2019/094733 filed on Jul. 4, 2019, which claims priority under 35 U.S.C. § 119 of Chinese Application No. 201811021272.4 filed on Sep. 3, 2018, the disclosure of which is incorporated by reference.

TECHNICAL FIELD

The present disclosure relates to a field of touch and control technology, and more particularly, to a fingertip detection method, a fingertip detection apparatus, a fingertip detection device, and a medium.

BACKGROUND

With continuous development of virtual touch in civilian and commercial fields, fingertip detection and positioning, as a key technology of virtual measurement and control, are also facing higher requirements. For fingertip detection and positioning, a fingertip algorithm based on geodesic distances and a coordinate algorithm based on geometric features may be used.

However, the fingertip algorithm based on geodesic distances is limited by postures and positions of a gesture when detecting a fingertip, and the fingertip cannot be detected when the finger is facing a camera. The coordinate algorithm based on geometric features has disadvantages of slow calculation speed and poor calculation effect. These problems affect accuracy and efficiency of fingertip detection and positioning, and make fingertip detection less robust in practical applications.

Therefore, there is a need for a fingertip detection method that is not affected by postures and positions of a gesture and has a fast detection speed.

SUMMARY

In view of the above problems, the present disclosure provides a fingertip detection method and apparatus. The fingertip detection method provided by the present disclosure can effectively locate the position of the fingertip, solve the influence of the gesture posture on the detection result when the fingertip is detected, improve the detection accuracy and efficiency, and the method has good robustness.

According to an aspect of the present disclosure, a method for detecting fingertips is proposed, including: determining a minimum-depth point in a hand area to be detected based on a depth image; determining a hand vertex in the hand area to be detected based on the depth image; determining a fingertip position based on the minimum-depth point and the hand vertex.

In some embodiments, wherein the determining a fingertip position based on the minimum-depth point and the hand vertex includes: if the minimum-depth point and the hand vertex are a same pixel, determining the pixel as the fingertip position; if the minimum-depth point and the hand vertex are different pixels, processing the minimum-depth point and the hand vertex based on a preset rule, and determining the fingertip position based on a processing result.

In some embodiments, wherein if the minimum-depth point and the hand vertex are different pixels, the processing the minimum-depth point and the hand vertex based on a preset rule and determining the fingertip position based on a processing result includes: determining a vertical-axis distance between the minimum-depth point and the hand vertex in the depth image; determining a depth distance between the minimum-depth point and the hand vertex in the depth image; determining the fingertip position based on the depth distance and the vertical-axis distance.

In some embodiments, wherein the determining the fingertip position based on the depth distance and the vertical-axis distance includes: if a difference between the depth distance and the vertical-axis distance is greater than or equal to a distance threshold, determining the minimum-depth point as the fingertip position; if the difference between the depth distance and the vertical-axis distance is less than the distance threshold, determining the hand vertex as the fingertip position.

In some embodiments, wherein the determining a minimum-depth point in a hand area to be detected based on a depth image includes: for each pixel in the hand area to be detected, taking a given area around the pixel as a decision area, and taking the pixel as a central pixel of the decision area; determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point; determining a stable point having the minimum depth in the depth image as the minimum-depth point of the hand area to be detected.

In some embodiments, wherein the determining a hand vertex in the hand area to be detected based on the depth image includes: for each pixel in the hand area to be detected, taking a given area around the pixel as a decision area, and taking the pixel as a central pixel of the decision area; determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point; determining a stable point having the maximum height in the depth image as the hand vertex of the hand area to be detected.

In some embodiments, wherein before the determining a hand vertex in the hand area to be detected based on the depth image, the method further includes: extracting an effective foreground depth map of the hand; determining the hand vertex in the hand area to be detected based on the effective foreground depth map of the hand.

In some embodiments, wherein the extracting an effective foreground depth map of the hand includes: determining, based on the depth image, a plurality of hand depths and a hand volume corresponding to each hand depth; determining an image interception position and obtaining the effective foreground depth map of the hand according to the determined plurality of hand depths and the hand volume corresponding to each hand depth.

In some embodiments, wherein the determining a plurality of hand depths and a hand volume corresponding to each hand depth includes: obtaining, according to a predetermined depth increment, depth sections at a plurality of depth points by using the minimum-depth point as a starting point; determining, for each depth section, a hand depth corresponding to the depth section and the number of pixels in the depth section; determining the hand volume corresponding to each hand depth based on the number of pixels in each depth section.

In some embodiments, wherein the determining an image interception position and obtaining the effective foreground depth map of the hand according to the determined hand depths and hand volumes includes: if a hand volume corresponding to a depth section is greater than a volume threshold and a hand depth corresponding to the depth section is not greater than a depth threshold, determining a hand depth corresponding to a previous depth section of the depth section as a target arm depth; or if a hand depth corresponding to a depth section is greater than the depth threshold and a calculated hand volume is not greater than the volume threshold, determining a hand depth corresponding to a previous depth section of the depth section as the target arm depth; obtaining the effective foreground depth map of the hand by performing image interception according to the target arm depth.

According to an aspect of the present disclosure, a fingertip detection apparatus is proposed, including: a minimum-depth point detecting module, configured to determine a minimum-depth point in a hand area to be detected based on a depth image; a hand vertex detecting module, configured to determine a hand vertex in the hand area to be detected based on the depth image; a fingertip position determining module, configured to determine a fingertip position based on the minimum-depth point and the hand vertex.

According to another aspect of the present disclosure, a fingertip detection device is proposed, the fingertip detection device comprising a processor and a memory, the memory including a set of instructions that, when executed by the processor, cause the fingertip detection device to execute the following operations: determining a minimum-depth point in a hand area to be detected based on a depth image; determining a hand vertex in the hand area to be detected based on the depth image; determining a fingertip position based on the minimum-depth point and the hand vertex.

In some embodiments, wherein the determining a fingertip position based on the minimum-depth point and the hand vertex comprises: if the minimum-depth point and the hand vertex are a same pixel, determining the pixel as the fingertip position; if the minimum-depth point and the hand vertex are different pixels, processing the minimum-depth point and the hand vertex based on a preset rule, and determining the fingertip position based on a processing result.

In some embodiments, wherein if the minimum-depth point and the hand vertex are different pixels, the processing the minimum-depth point and the hand vertex based on a preset rule and determining the fingertip position based on a processing result comprises: determining a vertical-axis distance between the minimum-depth point and the hand vertex in the depth image; determining a depth distance between the minimum-depth point and the hand vertex in the depth image; determining the fingertip position based on the depth distance and the vertical-axis distance.

In some embodiments, wherein the determining the fingertip position based on the depth distance and the vertical-axis distance comprises: if a difference between the depth distance and the vertical-axis distance is greater than or equal to a distance threshold, determining the minimum-depth point as the fingertip position; if the difference between the depth distance and the vertical-axis distance is less than the distance threshold, determining the hand vertex as the fingertip position.

In some embodiments, wherein the determining a minimum-depth point in a hand area to be detected based on a depth image comprises: for each pixel in the hand area to be detected, taking a given area around the pixel as a decision area, and taking the pixel as a central pixel of the decision area; determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point; determining a stable point having the minimum depth in the depth image as the minimum-depth point of the hand area to be detected.

In some embodiments, wherein the determining a hand vertex in the hand area to be detected based on the depth image comprises: for each pixel in the hand area to be detected, taking a given area around the pixel as a decision area, and taking the pixel as a central pixel of the decision area; determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point; determining a stable point having the maximum height in the depth image as the hand vertex of the hand area to be detected.

In some embodiments, wherein before the determining a hand vertex in the hand area to be detected based on the depth image, the method further comprises: extracting an effective foreground depth map of the hand; determining the hand vertex in the hand area to be detected based on the effective foreground depth map of the hand.

In some embodiments, wherein the extracting an effective foreground depth map of the hand comprises: determining, based on the depth image, a plurality of hand depths and a hand volume corresponding to each hand depth; determining an image interception position and obtaining the effective foreground depth map of the hand according to the determined plurality of hand depths and the hand volume corresponding to each hand depth.

In some embodiments, wherein the determining a plurality of hand depths and a hand volume corresponding to each hand depth comprises: obtaining, according to a predetermined depth increment, depth sections at a plurality of depth points by using the minimum-depth point as a starting point; determining, for each depth section, a hand depth corresponding to the depth section and number of pixels in the depth section; determining the hand volume corresponding to each hand depth based on the number of pixels in each depth section.

According to another aspect of the present disclosure, a computer-readable storage medium is proposed, in which computer-readable instructions are stored, and the method described previously is performed when the instructions are executed by a computer.

With the method, apparatus and device for detecting fingertips provided by the present disclosure, noise interference in the image can be well removed. When the fingertips are in different orientations, the position of the fingertips is detected and positioned. In particular, the method disclosed in the present disclosure can well overcome the problem of difficult fingertip recognition when a user gesture is in a position rotated around the center of the hand on a plane perpendicular to the depth direction, further improving the robustness of fingertip detection and its detection efficiency.

BRIEF DESCRIPTION OF THE DRAWINGS

In order to illustrate technical solutions of embodiments of the present disclosure more clearly, accompanying drawings required in description of the embodiments will be briefly introduced below. Obviously, the drawings in the following description are only some embodiments of the present disclosure. Those of ordinary skill in the art can obtain other drawings according to these drawings without making creative labor. The following drawings are not deliberately drawn to scale based on actual dimensions, and focus on illustrating a gist of the present disclosure.

DETAILED DESCRIPTION

The technical solutions of the embodiments of the present disclosure will be clearly and completely described below in conjunction with the accompanying drawings. Obviously, the described embodiments are only a part but not all of the embodiments of the present disclosure. All other embodiments obtained by a person of ordinary skill in the art based on the embodiments of the present disclosure without creative labor shall fall within the scope of the present disclosure.

As shown in the present disclosure and the claims, the words "a", "an", "one" and/or "the" do not specifically refer to a singular form but may include a plural form, unless the context explicitly indicates an exception. Generally, the terms "comprise" and "include" are only meant to include steps and elements that have been clearly identified, while these steps and elements do not constitute an exclusive list, and methods or devices may also include other steps or elements.

Although the present disclosure makes various references to certain modules in systems according to the embodiments of the present disclosure, any number of different modules may be used and run on a user terminal and/or server. The modules are merely illustrative, and different aspects of the systems and methods may use different modules.

Flowcharts are used in the present disclosure to illustrate operations performed by systems according to the embodiments of the present disclosure. It should be understood that previous or subsequent operations are not necessarily performed exactly in sequence. Instead, various steps may be processed in a reverse order or simultaneously as needed. At the same time, other operations may be added to these processes, or a step or steps may be removed from these processes.

Figure 1A:
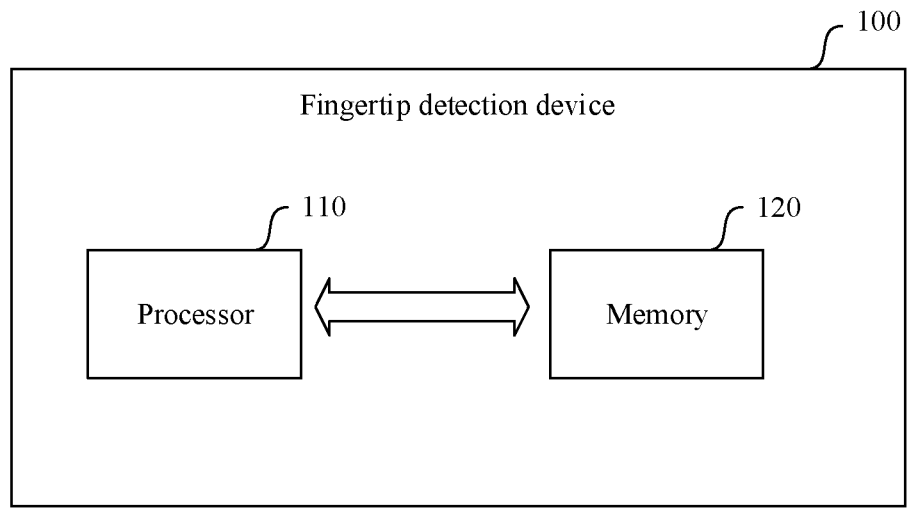
FIG. 1A illustrates an exemplary block diagram of a fingertip detection device according to an embodiment of the present disclosure.

FIG. 1A illustrates an exemplary block diagram of a fingertip detection device according to an embodiment of the present disclosure. The fingertip detection device 100 shown in FIG. 1A may be implemented as one or more dedicated or general-purpose computer system modules or means, such as a personal computer, a notebook computer, a tablet computer, a mobile phone, a personal digital assistance (PDA), smart glasses, a smart watch, a smart ring, a smart helmet, and any smart portable device. The fingertip detection device 100 may include at least one processor 110 and a memory 120.

The at least one processor is configured to execute program instructions. The memory 120 may exist in the fingertip detection device 100 as a program storage unit and a data storage unit in different forms, such as a hard disk, a read only memory (ROM), and a random access memory (RAM), which may be used to store various data files used in a process of processing and/or performing fingertip detection by the processor and possible program instructions executed by the processor. Although not shown in the figure, the fingertip detection device 100 may further include an input/output component to support input/output data flow between the fingertip detection device 100 and other components (such as an image acquisition apparatus 130). The fingertip detection device 100 may also transmit and receive information and data from a network through a communication port.

In some embodiments, the fingertip detection device 100 may receive a depth image collected by the image acquisition apparatus 130 and perform a fingertip detection method described below on the received depth image data. The image acquisition apparatus may be, for example, a depth camera, and specifically may be, for example, a real-sense camera; it may also be a binocular camera, such as a Bumblebee binocular camera.

In some embodiments, the memory comprising a set of instructions that, when executed by the processor, cause the fingertip detection device to execute the following operations: determining a minimum-depth point in a hand area to be detected based on a depth image; determining a hand vertex in the hand area to be detected based on the depth image; determining a fingertip position based on the minimum-depth point and the hand vertex.

In some embodiments, wherein the determining a fingertip position based on the minimum-depth point and the hand vertex comprises: if the minimum-depth point and the hand vertex are a same pixel, determining the pixel as the fingertip position; if the minimum-depth point and the hand vertex are different pixels, processing the minimum-depth point and the hand vertex based on a preset rule, and determining the fingertip position based on a processing result.

In some embodiments, wherein if the minimum-depth point and the hand vertex are different pixels, the processing the minimum-depth point and the hand vertex based on a preset rule and determining the fingertip position based on a processing result comprises: determining a vertical-axis distance between the minimum-depth point and the hand vertex in the depth image; determining a depth distance between the minimum-depth point and the hand vertex in the depth image; determining the fingertip position based on the depth distance and the vertical-axis distance.

In some embodiments, wherein the determining the fingertip position based on the depth distance and the vertical-axis distance comprises: if a difference between the depth distance and the vertical-axis distance is greater than or equal to a distance threshold, determining the minimum-depth point as the fingertip position; if the difference between the depth distance and the vertical-axis distance is less than the distance threshold, determining the hand vertex as the fingertip position.

In some embodiments, wherein the determining a minimum-depth point in a hand area to be detected based on a depth image comprises: for each pixel in the hand area to be detected, taking a given area around the pixel as a decision area, and taking the pixel as a central pixel of the decision area; determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point; determining a stable point having the minimum depth in the depth image as the minimum-depth point of the hand area to be detected.

In some embodiments, wherein the determining a hand vertex in the hand area to be detected based on the depth image comprises: for each pixel in the hand area to be detected, taking a given area around the pixel as a decision area, and taking the pixel as a central pixel of the decision area; determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point; determining a stable point having the maximum height in the depth image as the hand vertex of the hand area to be detected.

In some embodiments, wherein before the determining a hand vertex in the hand area to be detected based on the depth image, the method further comprises: extracting an effective foreground depth map of the hand; determining the hand vertex in the hand area to be detected based on the effective foreground depth map of the hand.

In some embodiments, wherein the extracting an effective foreground depth map of the hand comprises: determining, based on the depth image, a plurality of hand depths and a hand volume corresponding to each hand depth; determining an image interception position and obtaining the effective foreground depth map of the hand according to the determined plurality of hand depths and the hand volume corresponding to each hand depth.

In some embodiments, wherein the determining a plurality of hand depths and a hand volume corresponding to each hand depth comprises: obtaining, according to a predetermined depth increment, depth sections at a plurality of depth points by using the minimum-depth point as a starting point; determining, for each depth section, a hand depth corresponding to the depth section and number of pixels in the depth section; determining the hand volume corresponding to each hand depth based on the number of pixels in each depth section.

In some embodiments, the fingertip detection device may output an obtained fingertip position, for example, the fingertip position may be output to a computer processing module for subsequent processing. The embodiments of the present disclosure are not limited by the specific manner of the fingertip detection device outputting the fingertip position and the specific device to which it is output.

In some embodiments, the fingertip detection device may display the obtained fingertip position, for example, on a display panel or a control screen to achieve good human-computer interaction. The embodiments of the present disclosure are not limited by the specific manner of displaying the fingertip position.

Although in FIG. 1A, the processor 110 and the memory 120 are presented as separate modules, those skilled in the art may understand that the apparatus modules described above may be implemented as separate hardware devices or integrated into one or more hardware devices. As long as principles described in the present disclosure may be implemented, specific implementations of different hardware devices should not be taken as a factor limiting the scope of the present disclosure.

Figure 1B:
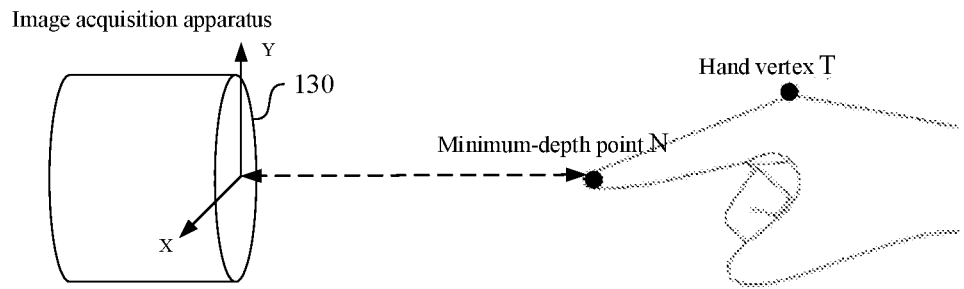
FIG. 1B illustrates a schematic diagram of a user gesture according to an embodiment of the present disclosure.
Figure 1C:
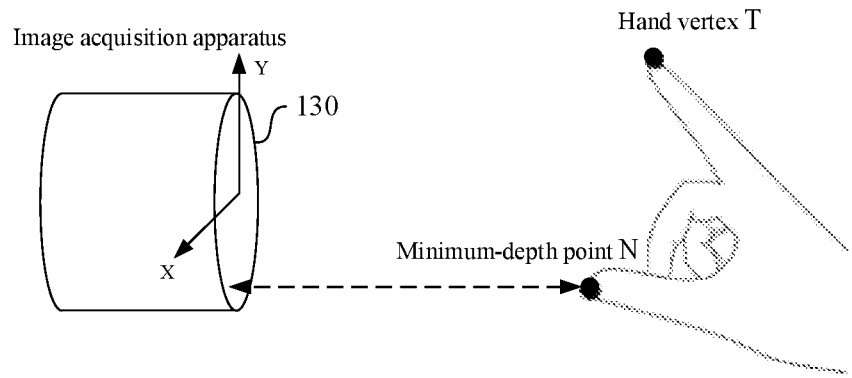
FIG. 1C illustrates a schematic diagram of another user gesture according to an embodiment of the present disclosure.

In a user's touch gesture acquired by the image acquisition apparatus 130, there is a pixel with the smallest vertical distance from a XY plane of the camera on a hand area to be detected, that is, a minimum-depth point N with the smallest depth value in the hand area to be detected; and in a vertical-axis direction of the acquired depth image, there is a pixel with the largest vertical-axis coordinate value in the hand area to be detected, which is a pixel with the maximum height in the hand area to be detected, that is, the hand vertex T. Corresponding positions of the minimum-depth point N and the hand vertex T when a user adopts two different touch gestures are shown schematically in FIGS. 1B and 1C. In FIG. 1B, the fingertip position is located at the minimum-depth point N, and in FIG. 1C, the fingertip position located at the hand vertex T. It should be understood that postures of a gesture adopt by the user are not limited by the embodiments of the present disclosure, and the user may adopt various possible touch gestures. The minimum-depth point N and the hand vertex T change with different postures of the user's gesture, and the fingertip position may also locate in one of the minimum-depth point N and the hand vertex T of the hand to be detected according to different postures of the user's gesture.

Figure 2:
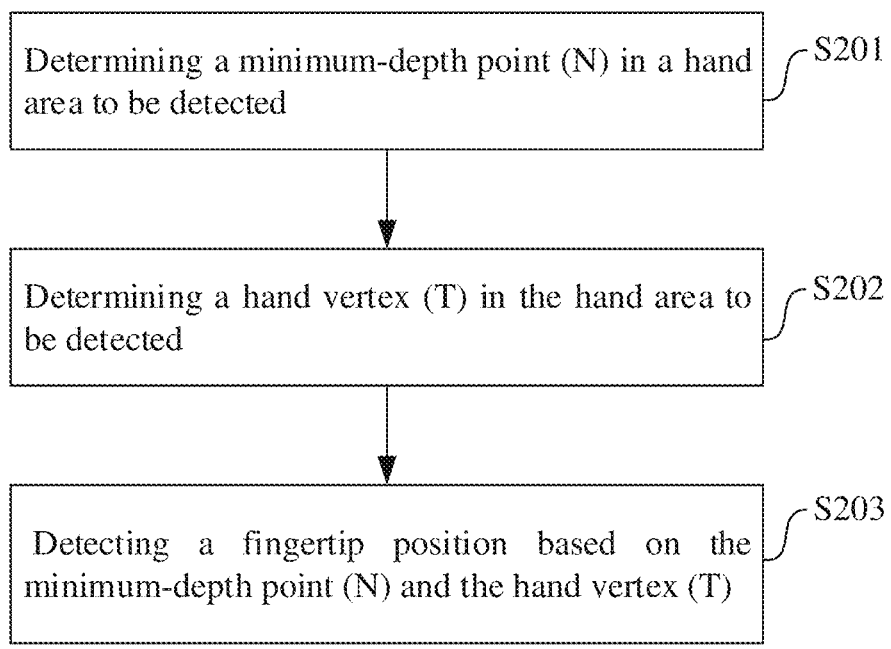
FIG. 2 illustrates an exemplary flowchart of a fingertip detection method according to an embodiment of the present disclosure.

Therefore, in order to well capture positions of the minimum-depth point N and the hand vertex T and to further realize detection of the fingertip position when the user takes various touch gestures, the present disclosure proposes a fingertip detection method. FIG. 2 illustrates an exemplary flowchart of a fingertip detection method according to an embodiment of the present disclosure.

As shown in FIG. 2, according to the fingertip detection method 200, first in step S201, a minimum-depth point N in a hand area to be detected is determined based on an acquired depth image. As described above, the depth image may be a depth image obtained by a depth camera, or may be a depth image obtained in advance in other ways. The embodiments of the present disclosure are not limited by sources of the depth image and ways of obtaining the depth image. For example, it may be a depth image directly acquired by a depth camera or a binocular camera, or it may be a depth image processed in advance by a computer.

In step S202, a hand vertex T in the hand area to be detected is determined based on the acquired depth image. The hand vertex T may be determined, for example, by comparing heights of respective pixels in the hand area to be detected, that is, comparing vertical-axis coordinate values of respective pixels in the hand area to be detected in a vertical-axis direction of the acquired depth image.

It should be understood that operations of steps S201 and S202 may be performed in parallel, or performed sequentially, which is by no means limited herein. Furthermore, as required, steps S201 and S202 may be performed based on different depth images obtained after preprocessing or local feature extraction, as long as these depth images are all derived from a same original depth image.

After the minimum-depth point N and the hand vertex T are obtained, in step S203, a fingertip position is further determined based on the minimum-depth point N and the hand vertex T. The determination of the fingertip position may be performed, for example, by logically judging coordinates of the two points N and P themselves to select a point representing the fingertip position therefrom as the fingertip, or by comparing a distance or positional relationship between the two points N and P with a preset threshold condition of the system, and further determining a point representing the fingertip position from the two points of the minimum-depth point N and the hand vertex T.

Figure 3:
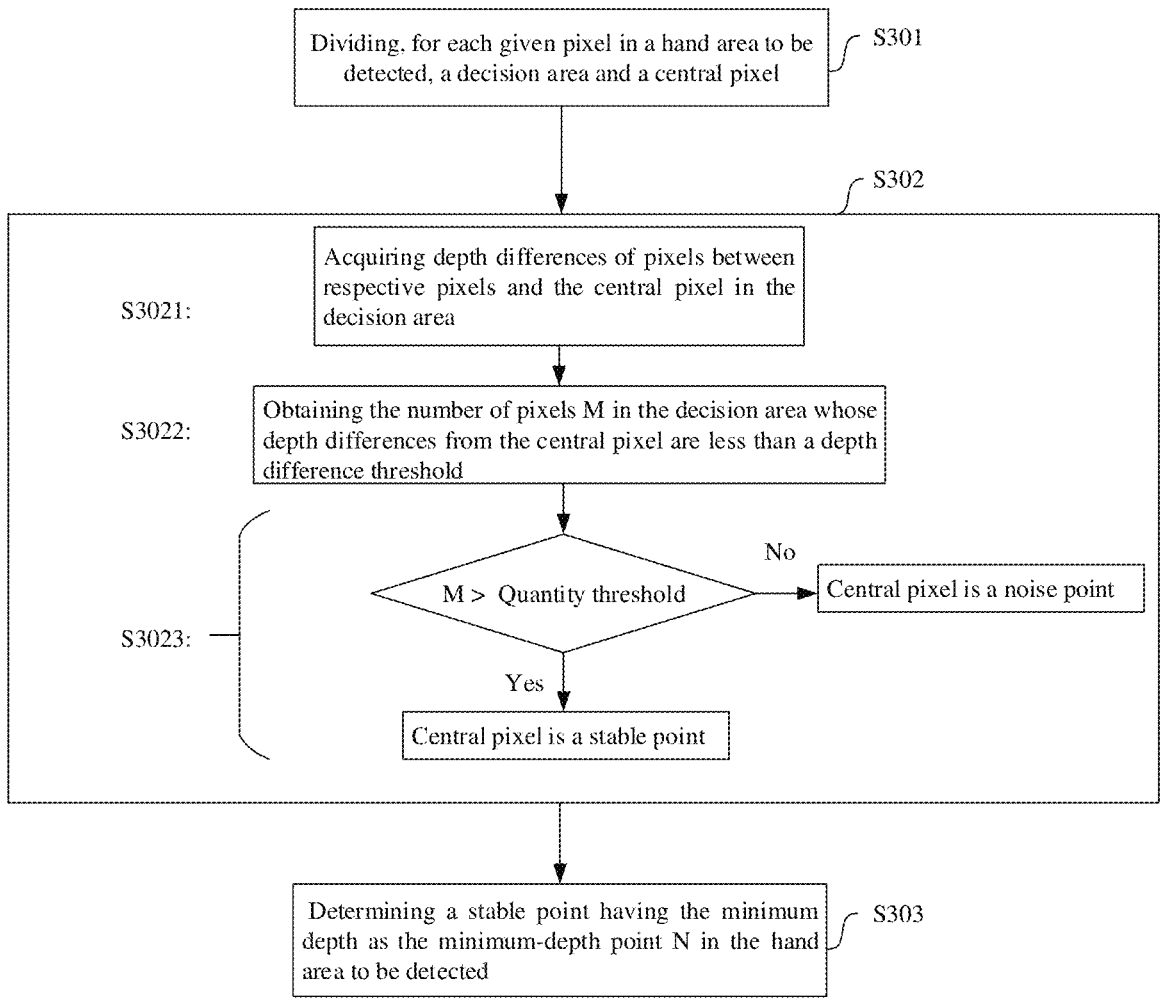
FIG. 3 illustrates an exemplary flowchart of determining a minimum-depth point in a hand area to be detected according to an embodiment of the present disclosure.

FIG. 3 illustrates an exemplary flowchart of determining a minimum-depth point in a hand area to be detected according to an embodiment of the present disclosure.

Referring to the flowchart in FIG. 3, the minimum-depth point N may be obtained through an area decision algorithm. Specifically, by step S301, the area decision algorithm first, for each pixel in the hand area to be detected, takes a given area around the pixel as a decision area, and takes the pixel as a central pixel of the decision area.

The given area represents a pixel area having a preset size, which may be, for example, a pixel area formed by 5*5 pixels, or may be a pixel area formed by 8*8 pixels. The embodiments of the present disclosure are not limited by the preset size of the given area.

After central pixels and their corresponding decision areas are divided, by step S302, a stability judgment for a given pixel is further implemented. This operation first calculates, via S3021, depth differences between respective pixels and the central pixel, and then, in step S3022, further determine the number of pixels M in the decision area whose depth differences from the central pixel are less than a depth difference threshold, where the depth difference threshold is used to screen for stable central pixels that meet the conditions. Finally, in step S3023, judgment is performed based on the previously calculated number M: if the number of pixels M whose depth differences from the central pixel are less than the depth difference threshold is greater than a quantity threshold, it is determined that the central pixel is a stable point; if the number of pixels whose depth differences from the central pixel are less than the quantity threshold is less than or equal to the quantity threshold, the central pixel is determined as a noise point.

The depth difference threshold is intended to represent a preset value of an absolute value of a depth difference between two pixels, and is used to screen for the central pixel(s) that meet the conditions as the stable point(s), which may be set based on actual requirements and calculation precision. For example, the depth difference threshold may be 2 mm or 5 mm. The embodiments of the present disclosure are not limited by the specific values of the set depth difference threshold.

The quantity threshold is intended to represent a preset quantity value. For example, the quantity threshold may be a same value for all sizes of decision areas, for example, it may be set to 15; alternatively, the quantity threshold may changes based on the size of the decision area, for example, the quantity threshold may be 8, for example, when the size of the decision area is a 5*5 pixel area, and the quantity threshold may be 20, for example, when the size of the decision area is an 8*8 pixel area. The embodiments of the present disclosure are not limited by the specific numerical values of the quantity threshold.

The above process may be described more specifically. For example, in a case where a 5*5 pixel area around a pixel (wherein the pixel is the central pixel) is selected as the decision area, set the depth difference threshold to 2 mm and the quantity threshold to 15, and in the 5*5 pixel area: if the number of pixels whose depth differences from the central pixel are less than 2 mm is greater than 15, it is determined that the central pixel is a stable point; if the number of pixels whose depth differences from the central pixel are less than 2 mm is less than or equal to 15, it is determined that the central pixel is a noise point.

One or more stable points will be obtained by the foregoing steps, and thereafter, they will be further screened in step S303. For example, in a case where there is only one stable point, it is the minimum-depth point by default; in a case where there are a plurality of stable points, based on depth values of respective stable points, a stable point having the minimum depth in the acquired depth image is determined as the minimum-depth point N of the hand area to be detected. For example, in the hand area to be detected after being screened, there are five stable points with depth values of 9 mm, 13 mm, 15 mm, 21 mm, and 25 mm, respectively, and then the stable point with a depth value of 9 mm is selected as the minimum-depth point.

Figure 4:
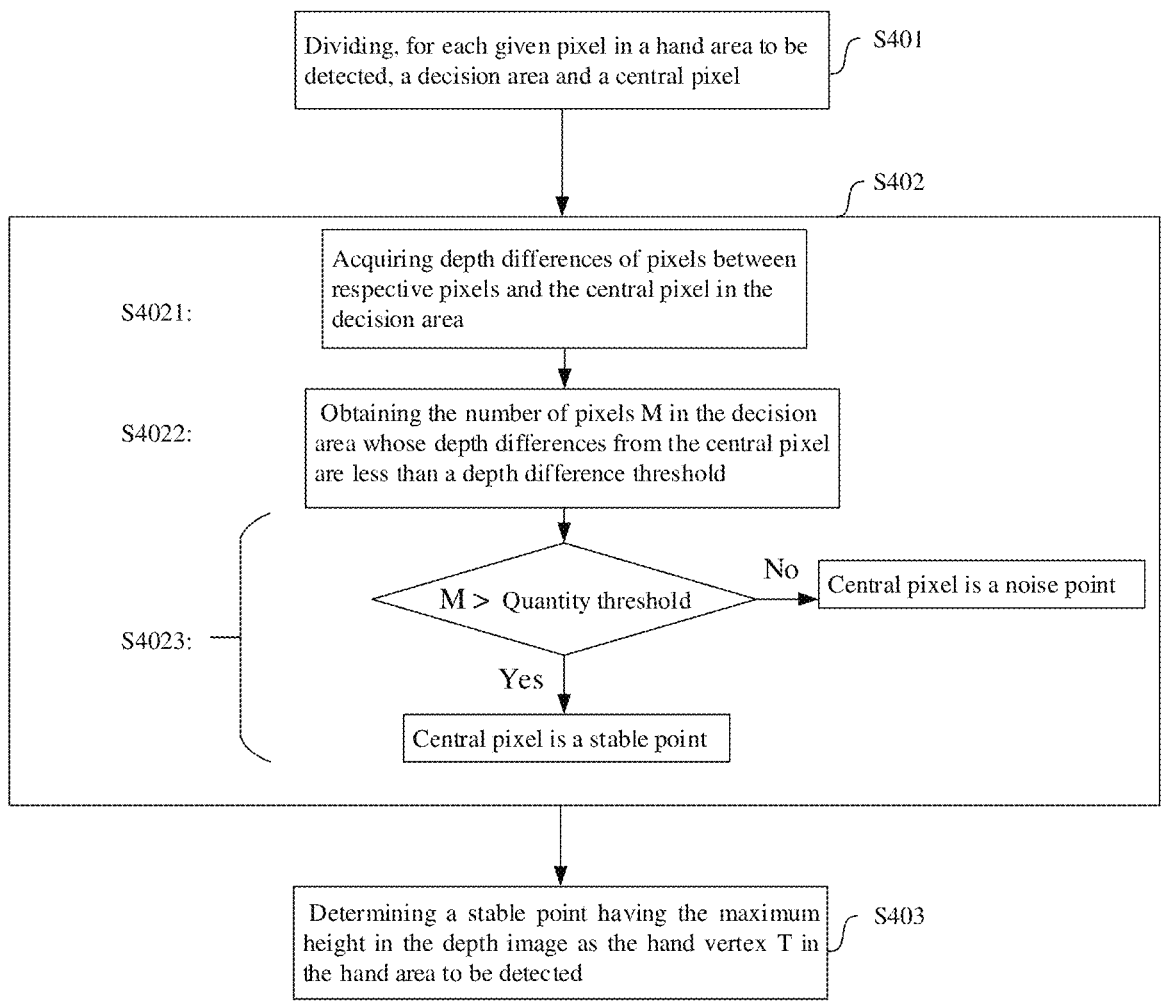
FIG. 4 illustrates an exemplary flowchart of determining a hand vertex in a hand area to be detected according to an embodiment of the present disclosure.

FIG. 4 illustrates an exemplary flowchart of determining a hand vertex T in a hand area to be detected according to an embodiment of the present disclosure.

Referring to this flowchart, the hand vertex T may be obtained by using an area decision algorithm. Next, the area decision algorithm will be further illustrated. For example, first, via step S401, for each pixel in the hand area to be detected, a given area around the pixel is taken as a decision area, and the pixel is taken as a central pixel of the decision area.

The given area represents a pixel area having a preset size, which may be, for example, a pixel area formed by 5*5 pixels, or may be a pixel area formed by 8*8 pixels. The embodiments of the present disclosure are not limited by the preset size of the given area.

After central pixels and their corresponding decision areas are divided, by step S402, a stability judgment for a given pixel is further implemented. First, via step S4021, depth differences between respective pixels and a central pixel in the decision area are obtained, and then, in step S3022, the number of pixels M in the decision area whose depth differences from the central pixel are less than the depth difference threshold is further determined. Finally, in step S4023, judgment is performed based on the previously calculated number M: if the number of pixels M whose depth differences from the central pixel are less than the depth difference threshold is greater than the quantity threshold, it is determined that the central pixel is a stable point; if the number of pixels whose depth differences from the central pixel are less than the quantity threshold is less than or equal to the quantity threshold, the central pixel is determined as a noise point.

As described above, the depth difference threshold is intended to represent a preset value of an absolute value of a depth difference between two pixels, and is used to screen for the central pixel(s) that meet the conditions as the stable point(s), which may be set based on actual requirements and calculation precision. For example, the depth difference threshold may be 2 mm or 5 mm. The embodiments of the present disclosure are not limited by the specific values of the set depth difference threshold.

The quantity threshold is intended to represent a preset quantity value. For example, the quantity threshold may be a same value for all sizes of decision areas, for example, it may be set to 15; alternatively, the quantity threshold may changes based on the size of the decision area, for example, the quantity threshold may be 8, for example, when the size of the decision area is a 5*5 pixel area, and the quantity threshold may be 20, for example, when the size of the decision area is an 8*8 pixel area. The embodiments of the present disclosure are not limited by the specific numerical values of the quantity threshold.

One or more stable points will be obtained by the foregoing steps, and thereafter, they will be further screened in step S403. For example, in a case where there is only one stable point, it is the minimum-depth point by default; in a case where there are a plurality of stable points, based on vertical-axis coordinate values of respective stable points in a vertical-axis direction of the depth image, a stable point having the maximum height in the acquired depth image, that is, a stable point having the largest vertical-axis coordinate value, is determined as the minimum-depth point N of the hand area to be detected. For example, there are 3 stable points in the hand area to be detected after being screened, and their coordinates in the vertical-axis direction of the acquired depth image, that is, their heights are H1, H2, H3, respectively, and H1<H2<H3, then the stable point with a height of H3 is selected as the hand vertex of the hand area to be detected. It should be understood that a height in the depth image may be represented by the number of pixels, spatial coordinates, or calibration coordinates, etc., and the present disclosure is not limited by a manner of obtaining heights of the pixels.

In some embodiments, an effective foreground depth map of the hand may further be extracted from the depth image before the hand vertex in the area to be detected are determined based on the depth image. The effective foreground depth map of the hand is a target depth image obtained after removing background pixels in the current depth image that are not related to the hand area to be detected. The hand vertex is determined based on the hand area to be detected and then based on the effective foreground depth map of the hand. By filtering out background pixels that have low correlation with the hand area to be detected, interference of an environmental background on identifying the vertex T of the hand to be detected is eliminated, and thus accuracy of subsequent detection of the hand vertex T is improved.

In some embodiments, extracting the effective foreground depth map of the hand may include: determining, based on the depth image, a plurality of hand depths and a hand volume corresponding to each hand depth; determining an image interception position and obtaining the effective foreground depth map of the hand according to the determined plurality of hand depths and the hand volume corresponding to each hand depth. A hand depth L represents a depth value at a current depth section in the depth image. The plurality of hand depths corresponds to depth values of a plurality of different depth sections in the depth image.

Figure 5:
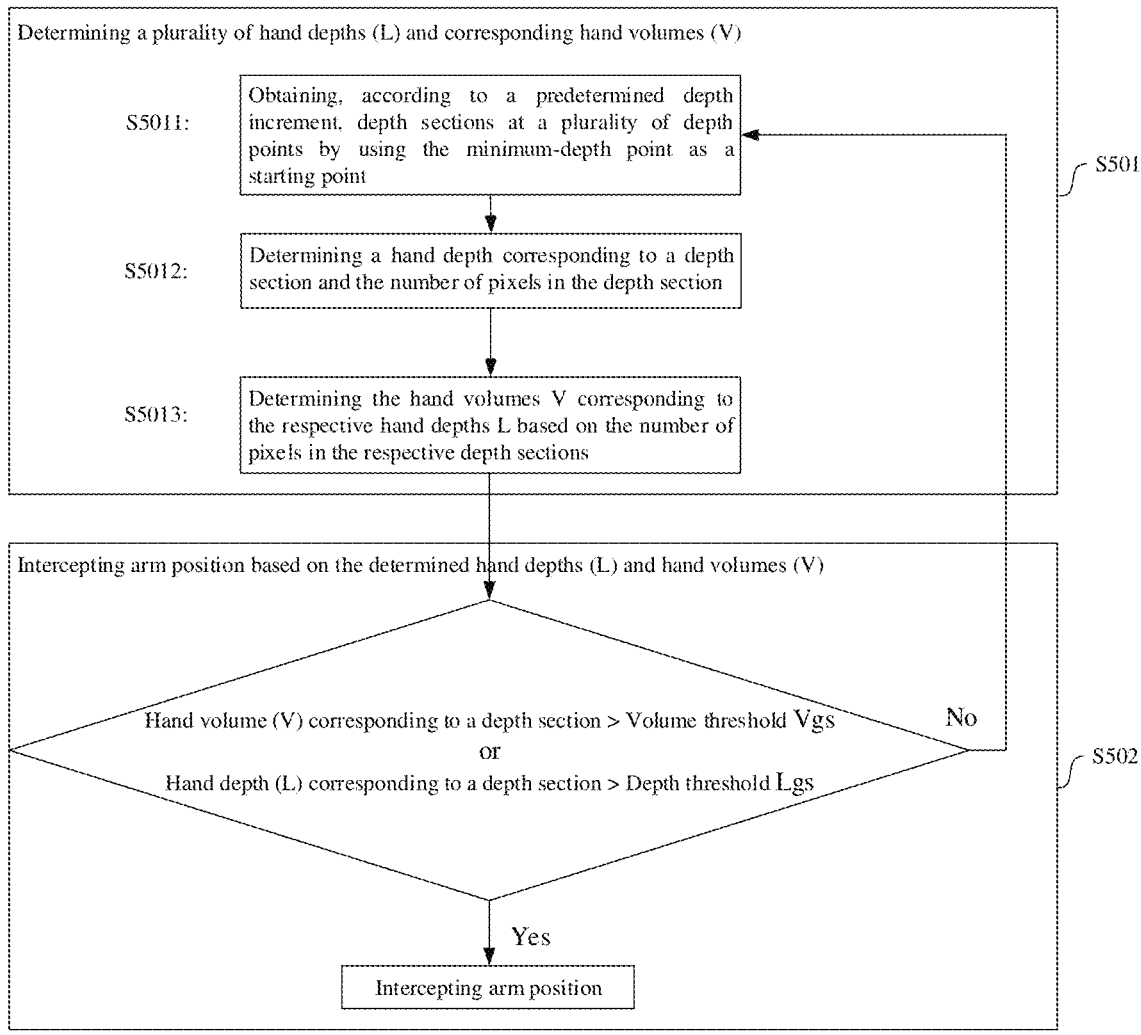
FIG. 5 illustrates an exemplary flowchart of extracting an effective foreground depth map (ED) of a hand according to an embodiment of the present disclosure.

FIG. 5 illustrates an exemplary flowchart of extracting an effective foreground depth map (ED) of a hand according to an embodiment of the present disclosure. As an example, steps of extracting the effective foreground depth map 500 of the hand will be further described below with reference to FIG. 5.

As shown in FIG. 5, first, by step S5011, traverse different sections of the depth map according to a predetermined depth increment $\Delta m$ (unit: millimeter) by using a depth value of the obtained minimum-depth point N as a starting point, to obtain depth sections at a plurality of depth points. The predetermined depth increment $\Delta m$ may be set to 1 mm or 2 mm. Furthermore, on each section (the i-th section), according to step S5012, the number of pixels $P_i$ in the current depth section is calculated, and a hand depth $L_i$ corresponding to the section is obtained. The hand depth $L_i$ is a vertical distance from the minimum-depth point N to the current depth section, that is, a difference between the depth value of the current depth section and the depth value of the minimum-depth point N. In short, for the i-th section, $L_i$ is the hand depth corresponding to the section, $P_i$ is the number of pixels on the section, where i is determined by the number of times the depth increment $\Delta m$ is executed, and its value is a positive integer 1, 2, 3 . . . . For example, if the depth value of the minimum-depth point N is 7 mm, the entire image is traversed in a depth increment $\Delta m$ of 2 mm, and then a corresponding hand depth $L_5$ for the fifth depth section reached after the fifth execution of the time depth increment, that is, a depth section with a depth value of 17 mm, is 10 mm.

After the hand depth $L_i$ corresponding to the current depth section is obtained accordingly, further, in step S5013, a hand volume $V_i$ corresponding to each hand depth $L_i$ is determined based on the number of pixels $P_i$ in each depth section. For example, a hand volume corresponding to each depth section may be split into a sum of a volume value corresponding to a previous section of the current depth section and a newly added volume value of the current depth section. It is specifically expressed as:

$$V_i = V_{i-1} + \Delta V_i$$

where $V_i$ is the hand volume value corresponding to the current depth section, $V_{i-1}$ is the hand volume value corresponding to the previous section of the current depth section, and $\Delta V_i$ is the newly added hand volume value of the current depth section, and where i is a positive integer 1, 2, 3, . . . , and a value of an initial volume $V_0$ is set to 0. The newly added hand volume value $\Delta V_i$ of the current depth section may be further calculated from an area of the current depth section and the depth increment $\Delta m$. It is specifically expressed as:

$$\Delta V_i = S_i * \Delta m$$

where $S_i$ is the sectional area corresponding to the current depth section, and $\Delta m$ is the predetermined depth increment. Herein it is approximately assumed that within the length of the depth increment $\Delta m$, each section has a same sectional area as the current depth section. The sectional area $S_i$ of the current depth section may be calculated according to the number of pixels in the depth section. For example, for a depth image captured by a depth camera or camera, a pixel unit needs to be converted to a millimeter unit when calculating the area $S_i$ of the current depth section. The conversion formula is "millimeter unit=pixel unit*l*R (where R=depth value of a pixel/camera focal length, l is a distance between a pixel and another pixel." Based on the conversion formula, a formula for calculating the sectional area is as follows:

$$S_i = P_i * s * R_i * R_i$$

where $P_i$ is the number of pixels corresponding to the current depth section; s is an area of a single pixel, where s=lx*ly, lx is a distance between a pixel and another pixel in a horizontal-axis direction, ly is a distance between a pixel and another pixel in a vertical-axis direction, and the distance between a pixel and another pixel refers to a distance from one edge of a pixel to a same edge of an adjacent pixel, such as a distance between an upper edge of a pixel and an upper edge of an adjacent pixel; $R_i$ is a ratio of a depth value of a pixel corresponding to the current depth section to the focal length of the camera, and is used to convert the pixel unit to the millimeter unit. Since pixels located on a same depth section have a same depth value and camera focal length value, the same depth section has a unique $R_i$ corresponding to it. As described above, i is determined by the number of times the depth increment $\Delta m$ is executed, and its values is a positive integer 1, 2, 3, . . . . In summary, a volume value of the hand corresponding to the current depth section may be expressed as:

$$V_i = V_{i-1} + A \quad V_i = V_{i-1} + P_i * s * R_i * R_i * \Delta m$$

where $P_i$ is the number of pixels corresponding to the current depth section; s is an area of a single pixel, where s=lx*ly, lx is a distance between a pixel and another pixel in the horizontal-axis direction, ly is a distance between a pixel and another pixel in the vertical-axis direction, and the distance between a pixel and another pixel refers to a distance from one edge of a pixel to a same edge of an adjacent pixel, such as a distance between an upper edge of a pixel and an upper edge of an adjacent pixel; $R_i$ is a ratio of a depth value of a pixel corresponding to the current depth section to the focal length of the camera, and is used to convert the pixel unit to the millimeter unit; and $\Delta m$ is a depth increment. Based on the above calculation formulas, values of the hand depth L and the hand volume V corresponding to each depth section may be obtained.

The above steps may be described more specifically. For example, in a case where the depth value of the minimum-depth point is 5 mm, and the depth increment $\Delta m$ is 2 mm, then for the current 5th section, the depth value of the current depth section is 15 mm and the camera's camera focal length value is 3 mm, thus a value of $R_5$ corresponding to the current depth section may be calculated as 5. If the number of pixels $P_5$ on the section is 500, and if, in the section, the distance lx between a pixel and another pixel in the horizontal-axis direction is 0.3 mm, and the distance ly between a pixel and another pixel in the vertical-axis direction is 0.4 mm, then an area s of a single pixel is calculated as 0.12 mm$^2$, and a value of hand volume $V_4$ corresponding to a previous depth section is 5000 mm$^3$, and then a hand volume value corresponding to the current section is:

$$V_5 = 5000 \text{ mm}^3 + 500*0.12*5*5*2 = 5000+3000 = 8000 \text{ mm}^3$$

Thereafter, based on the determined hand depth L and the hand volume V in the current depth section, interception of an arm position is further implemented by step S502. The arm position may be intercepted by judging the two parameters of the hand depth L and the hand volume V. For example, a volume threshold Vgs and a depth threshold Lgs may be set, and values of a corresponding hand depth L and hand volume V obtained at each depth section are compared with the depth and volume thresholds Lgs, Vgs.

The volume threshold is intended to represent a value of the hand volume. The volume threshold may be set based on actual requirements, for example, it may be set to an average volume value of a human hand, or a measurement value of a current user's hand volume. The volume threshold may be, for example, 15000 mm$^3$, or it may be 20,000 mm$^3$. The embodiments of the present disclosure are not limited by the manner of setting the volume threshold and the specific set numerical values.

The depth threshold is intended to represent a length value of the hand in a depth direction. The depth threshold may be set based on actual requirements, for example, it may be set to an average length of a human hand, or a measured value of a current user's hand length. The depth threshold may be, for example, 150 mm, or it may be 170 mm. The embodiments of the present disclosure are not limited by the manner of setting the depth threshold and the specific set numerical values.

In some embodiments, if a hand volume V corresponding to a depth section is greater than the volume threshold Vgs and a hand depth L corresponding to the depth section is not greater than the depth threshold Lgs, a hand depth L corresponding to a previous depth section of the depth section is determined as an target arm depth; or if a hand depth L corresponding to a depth section is greater than the depth threshold Lgs and a calculated hand volume V is not greater than the volume threshold Vgs, a hand depth L corresponding to a previous depth section of the depth section is determined as an target arm depth. Then, based on the determined target arm depth, arm position interception may be performed on the original depth image to obtain an effective foreground depth map of the hand. For example, depth values of all pixels after the target arm depth may be set to 0.

The above steps may be described more specifically. For example, in a case where the depth threshold Lgs is 150 mm and the volume threshold Vgs is 15000 mm$^3$, different sections of the depth map are traversed in a depth increment of 1 mm from the minimum-depth point. If a hand depth L corresponding to the current depth section (the 131th section) is 151 mm, which is greater than 150 mm, and a hand volume V corresponding to the current depth section (the 131th section) is less than or equal to 15000 mm$^3$, an arm depth L corresponding to a previous depth section (the 130th section) is determined as the target arm depth. Alternatively, if the hand volume V corresponding to the current depth section (the 131th section) is 15004 mm$^3$, which is greater than 15000 mm$^3$, and the hand depth L corresponding to the current depth section (the 131th section) is less than or equal to 150 mm, the arm depth L corresponding to the previous depth section (the 130th section) is determined as the target arm depth.

After acquisition of the minimum-depth point N and the hand vertex T is achieved, in the embodiments of the present disclosure, a fingertip position will be further determined based on the minimum-depth point N and the hand vertex T.

Depending on different postures of the user's gesture, the minimum-depth point N and the hand vertex T extracted based on the depth image may have same or different position coordinates. If the minimum-depth point N and the hand vertex T extracted based on positions of the user's gesture are a same pixel in the depth image, the pixel may be directly determined as the fingertip position. For example, if the user extends only a single finger for touch and control operations, his/her fingertip may be located at the minimum-depth point and the hand vertex of the image simultaneously. If the extracted minimum-depth point N and the hand vertex T are different pixels, the minimum-depth point and the hand vertex will be further processed based on a preset rule, and the finger position is determined based on a processing result.

The preset rule may be selected based on actual requirements. The rule may be, for example, logically judging coordinates of the two points N and P themselves to select a point representing the fingertip position therefrom as the fingertip; or, comparing a distance or positional relationship between the above two points N and P with a preset threshold condition of the system, and then determining a point representing the fingertip position from the two points of the minimum-depth point N and the hand vertex T. The embodiments of the present disclosure are not limited by the specific contents of the preset rule.

For example, the preset rule may be set in advance before image processing, at this time, a same rule is used for all input images, for example; or it may dynamically change during image processing, for example, it may change based on characteristics of input images, so that different preset rules are used for different input images. The embodiments of the present disclosure are not limited by an application range of the preset rule and a setting time of the preset rule.

Figure 6:
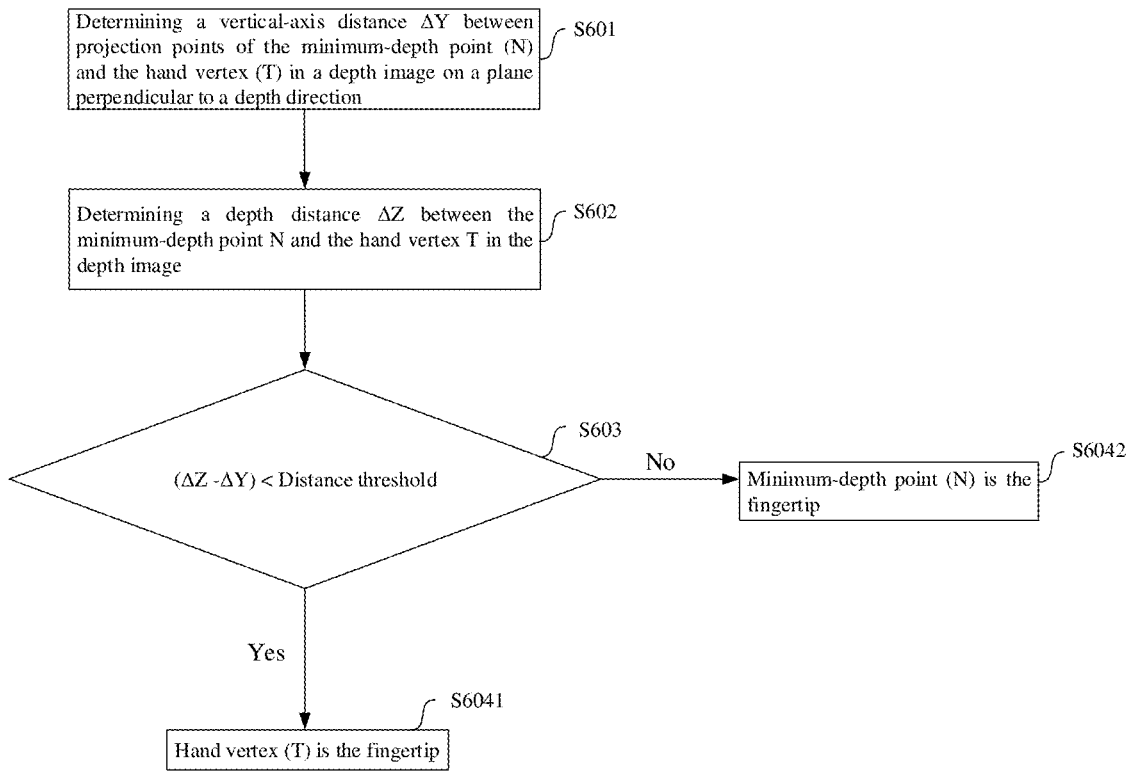
FIG. 6 illustrates an exemplary flowchart of determining a fingertip position based on a minimum-depth point (N) and a hand vertex (T) in a case where the minimum-depth point N and the hand vertex T extracted according to an embodiment of the present disclosure are different pixels.

FIG. 6 illustrates an exemplary flowchart of determining a fingertip position based on the minimum-depth point N and the hand vertex T in a case where the minimum-depth point N and the hand vertex T extracted according to the embodiments of the present disclosure are different pixels. As an example, operations of determining the fingertip position 600 based on the obtained minimum-depth point N and the hand vertex T when the minimum-depth point N and the hand vertex T are different pixels will be described below with reference to FIG. 6.

As shown in FIG. 6, based on the obtained minimum-depth point N and the hand vertex T, first, refer to step S601 to obtain coordinate values $D_T$ and $D_N$ of the minimum-depth point N and the hand vertex T on the vertical axis of the depth image, that is, vertical-axis coordinates of their pixels, which may be distance coordinates from a set origin or pixel coordinates from a set origin. When the vertical-axis coordinates are pixel coordinates, based on the obtained vertical-axis coordinates of the pixels and by further applying the conversion formula "millimeter unit=pixel unit*ly*R (where R=depth value of a pixel/camera focal length, and ly is a distance between a pixel and another pixel in the vertical-axis direction)", the vertical-axis coordinate data of the two pixels in the above pixel unit are converted to vertical-axis coordinate data in the millimeter unit of projection points of the two pixels on a plane perpendicular to the depth direction, which is specifically expressed as:

$$Y_T = D_T * ly * R_T \text{(where } R_T\text{=depth value of the hand vertex } T\text{/camera focal length)}$$

$$Y_N = D_N * ly * R_N \text{(where } R_N\text{=depth value of the minimum-depth point } N\text{/camera focal length)}$$

Based on this, a vertical-axis distance $\Delta Y$ in the vertical-axis direction between the projection points of the minimum-depth point N and the hand vertex T on the plane perpendicular to the depth direction may be calculated, and the unit is millimeter. It may be specifically expressed as:

$$\Delta Y = |Y_T - Y_N|$$

Thereafter, according to step S602, depth values $Z_N$ and $Z_T$ of the minimum-depth point N and the hand vertex T are obtained, and further, a depth distance $\Delta Z$ between the above minimum-depth point N and the hand vertex T in the depth direction may be calculated, and the unit is millimeter. It may be specifically expressed as:

$$\Delta Z = |Z_T - Z_N|$$

It should be understood that the operations of steps S601 and S602 may be performed in parallel, or performed sequentially, which are by no means limited herein.

Based on the above obtained vertical-axis distance and the depth distance, referring to step S603, a difference Diff between the depth distance $\Delta Z$ and the vertical-axis distance $\Delta Y$ of the minimum-depth point N and the hand vertex T is obtained, which is specifically expressed as:

$$\text{Diff} = \Delta Z - \Delta Y$$

The above difference Diff is compared with a distance threshold. If the difference Diff between the depth distance $\Delta Z$ and the vertical-axis distance $\Delta Y$ is greater than or equal to the distance threshold, as shown in step S6042, the minimum-depth point N is determined as the fingertip position; if the difference Diff between the depth distance $\Delta Z$ and the vertical-axis distance $\Delta Y$ is less than the distance threshold, as shown in step S6041, the hand vertex T is determined as the fingertip position.

The distance threshold is a preset distance value, which may be set based on actual requirements, for example, it may be set to 30 mm or 45 mm. The embodiments of the present disclosure are not limited by the specific values of the distance threshold and its setting manner.

The above steps may be described more specifically. For example, the distance threshold is set to 30 mm, and: if the difference Diff between the depth distance $\Delta Z$ and the vertical-axis distance $\Delta Y$ is greater than or equal to 30 mm, the minimum-depth point N is the fingertip position; if the difference Diff between the depth distance $\Delta Z$ and the vertical-axis distance $\Delta Y$ is less than 30 mm, the hand vertex T is the fingertip position.

In some embodiments, the fingertip detection method further includes a step of outputting the detected fingertip position. For example, the fingertip position may be output to a computer processing module for subsequent processing. The embodiments of the present disclosure are not limited by the specific manner of the fingertip detection device outputting the fingertip position and the specific device to which it is output.

In some embodiments, the fingertip detection method further includes a step of displaying the obtained fingertip position, for example, on a display panel or a control screen to achieve good human-computer interaction. The embodiments of the present disclosure are not limited by the specific manner of displaying the fingertip position.

Figure 7:
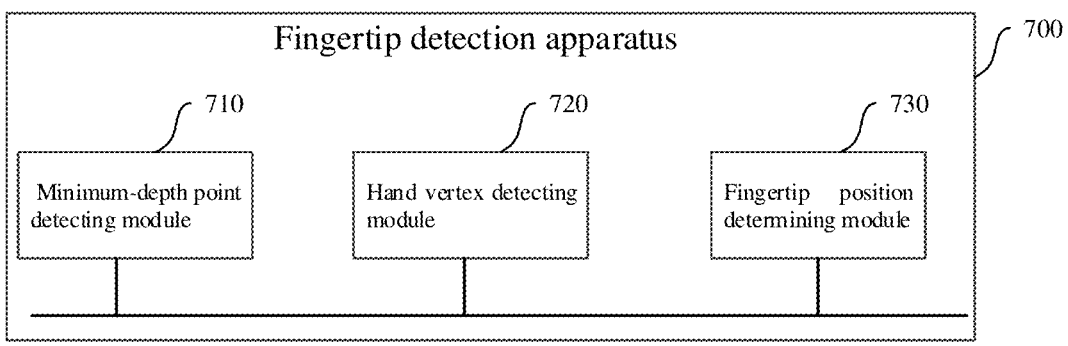
FIG. 7 illustrates a schematic block diagram of a fingertip detection apparatus according to an embodiment of the present disclosure.

FIG. 7 shows a schematic block diagram of a fingertip detection apparatus according to an embodiment of the present disclosure.

As shown in FIG. 7, the fingertip detection apparatus 700 may include a minimum-depth point detecting module 710, a hand vertex detecting module 720, and a fingertip position determining module 730. The minimum-depth point detecting module 710 is configured to determine a minimum-depth point N in a hand area to be detected based on a depth image by processing the image, and may perform the process shown in FIG. 3 to realize the determination of the minimum-depth point N. The hand vertex detecting module 720 is configured to determine a hand vertex T in the hand area to be detected based on the depth image by processing the image, and may perform the process shown in FIG. 4 to realize the determination of the hand vertex T. The fingertip position determining module 730 is configured to determine a fingertip position based on the minimum-depth point N and the hand vertex T. Among them, the determination of the fingertip position may be realized according to a coordinate position relationship between the minimum-depth point and the hand vertex. If the minimum-depth point and the hand vertex are a same pixel, the pixel may be determined as the fingertip position. If the minimum-depth point and the hand vertex are different pixels, the process shown in FIG. 6 may be performed to determine the fingertip position.

In some embodiments, the fingertip detection apparatus may further include an output apparatus. The output apparatus is connected to an external computing device, and is intended to output the obtained fingertip position to the computing device for subsequent processing operations. The computing device may be, for example, a computer, a mobile phone, etc. The embodiments of the present disclosure are not limited by the type of the computing device and the way of the output device being connected to the external computing device.

In some embodiments, the fingertip detection apparatus may further include a display apparatus, which may display the obtained fingertip position to achieve good human-computer interaction with users. The display apparatus may be, for example, a display panel or a display screen. The embodiments of the present disclosure are not limited by the specific type of the display apparatus.

According to another aspect of the present disclosure, there is also provided a computer-readable storage medium on which computer-readable instructions are stored, and when the instructions are executed by a computer, the method described above may be performed.

Program portions in the technology may be considered as "products" or "manufactures" existing in the form of executable code and/or related data, which is participated or realized by computer-readable media. A tangible, permanent storage medium may include a memory or storage used by any computer, processor, or similar device, or related module, for example, various semiconductor memories, magnetic tape drives, magnetic disk drives or any similar device capable of providing storage functions for software.

All or a part of software may sometimes communicate over a network, such as the Internet or other communication networks. This type of communication may load software from one computer device or processor to another, for example, from a server or host computer of the fingertip detection device to a hardware platform of a computer environment, or other computer environment to implement the system, or a system with similar functions related to providing information required for fingertip detection. Therefore, other medium, such as a light wave, a radio wave, an electromagnetic wave, etc., capable of transferring software elements may also be used as a physical connection between local devices to realize propagation through cables, optical cables or air. Physical media used for carrying waves, such as electrical cables, wireless connections, fiber optic cables and the like may also be considered as media that carry the software. As used herein, unless restricted to tangible "storage" media, other terms referring to computer or machine "readable media" refer to media that participate during execution of any instruction by a processor.

Meanwhile, specific phrases are used in the present disclosure to describe the embodiments of the present disclosure. For example, "one embodiment", "an embodiment", and/or "some embodiments" means a certain feature, structure, or characteristic related to at least one embodiment of the present disclosure. Therefore, it should be emphasized and noted that the "an embodiment", "one embodiment" or "an alternative embodiment" mentioned two or more times in different places of this specification does not necessarily refer to a same embodiment. In addition, certain features, structures or characteristics in one or more embodiments of the present disclosure may be appropriately combined.

In addition, those skilled in the art should understand that aspects of the present disclosure may be illustrated and described by several patentable categories or situations, including any new and useful process, machine, combination of products or materials, or any new and useful improvement thereto. Accordingly, aspects of the present disclosure may be performed entirely by hardware, entirely by software (including firmware, resident software, micro-code, etc.), or by a combination of hardware and software. All of the above hardware or software may be referred to as a "data block", a "module", an "engine", a "unit", a "component" or a "system". In addition, aspects of the present disclosure may be manifested as a computer product present in one or more computer-readable media, the product including computer-readable program code.

All terms (including technical and scientific terms) used herein have the same meanings as commonly understood by one of ordinary skill in the art to which this disclosure belongs, unless otherwise defined. It should also be understood that terms such as those defined in ordinary dictionaries should be interpreted to have meanings consistent with their meaning in the context of the relevant technology, and should not be interpreted in an idealized or extremely formal sense unless explicitly so defined herein.

The above is a description of the present disclosure and should not be considered as a limitation thereto. Although several exemplary embodiments of the present disclosure have been described, those skilled in the art will readily understand that many modifications may be made to the exemplary embodiments without departing from the novel teachings and advantages of the present disclosure. Accordingly, all such modifications are intended to be included within the scope of this disclosure as defined by the claims. It should be understood that the above is a description of the present disclosure and should not be considered to limit the present disclosure to the specific embodiments as disclosed, and modifications to the disclosed embodiments and other embodiments are intended to be included within the scope of the appended claims. This disclosure is defined by the claims and equivalents thereof.

What is claimed is:

1. A fingertip detection method, comprising:
   determining a minimum-depth point in a hand area to be detected based on a depth image;
   determining a hand vertex in the hand area to be detected based on the depth image;
   determining a fingertip position based on the minimum-depth point and the hand vertex;
   wherein the determining a fingertip position based on the minimum-depth point and the hand vertex comprises:
   if the minimum-depth point and the hand vertex are a same pixel, determining the pixel as the fingertip position;
   if the minimum-depth point and the hand vertex are different pixels, determining a vertical-axis distance between the minimum-depth point and the hand vertex in the depth image; determining a depth distance between the minimum-depth point and the hand vertex in the depth image; determining the fingertip position based on the depth distance and the vertical-axis distance.

2. The fingertip detection method of claim 1, wherein the determining the fingertip position based on the depth distance and the vertical-axis distance comprises:
   if a difference between the depth distance and the vertical-axis distance is greater than or equal to a distance threshold, determining the minimum-depth point as the fingertip position;
   if the difference between the depth distance and the vertical-axis distance is less than the distance threshold, determining the hand vertex as the fingertip position.

3. The fingertip detection method of claim 1, wherein the determining a minimum-depth point in a hand area to be detected based on a depth image comprises:

for each pixel in the hand area to be detected, taking a given area around the pixel as a decision area, and taking the pixel as a central pixel of the decision area;

determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point;

determining a stable point having the minimum depth in the depth image as the minimum-depth point of the hand area to be detected.

4. The fingertip detection method of claim 1, wherein the determining a hand vertex in the hand area to be detected based on the depth image comprises:

for each pixel in the hand area to be detected, taking a given area around the pixel as a decision area, and taking the pixel as a central pixel of the decision area;

determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point;

determining a stable point having the maximum height in the depth image as the hand vertex of the hand area to be detected.

5. The fingertip detection method of claim 1, wherein before the determining a hand vertex in the hand area to be detected based on the depth image, the method further comprises:

extracting an effective foreground depth map of the hand;

determining the hand vertex in the hand area to be detected based on the effective foreground depth map of the hand.

6. The fingertip detection method of claim 5, wherein the extracting an effective foreground depth map of the hand comprises:

determining, based on the depth image, a plurality of hand depths and a hand volume corresponding to each hand depth;

determining an image interception position and obtaining the effective foreground depth map of the hand according to the determined plurality of hand depths and the hand volume corresponding to each hand depth.

7. The fingertip detection method of claim 6, wherein the determining a plurality of hand depths and a hand volume corresponding to each hand depth comprises:

obtaining, according to a predetermined depth increment, depth sections at a plurality of depth points by using the minimum-depth point as a starting point;

determining, for each depth section, a hand depth corresponding to the depth section and number of pixels in the depth section;

determining the hand volume corresponding to each hand depth based on the number of pixels in each depth section.

8. The fingertip detection method of claim 6, wherein the determining an image interception position and obtaining the effective foreground depth map of the hand according to the determined hand depths and hand volume comprises:

if a hand volume corresponding to a depth section is greater than a volume threshold and a hand depth corresponding to the depth section is not greater than a depth threshold, determining a hand depth corresponding to a previous depth section of the depth section as a target arm depth; or if a hand depth corresponding to a depth section is greater than the depth threshold and a calculated hand volume is not greater than the volume threshold, determining a hand depth corresponding to a previous depth section of the depth section as the target arm depth;

obtaining the effective foreground depth map of the hand by performing image interception according to the target arm depth.

9. A fingertip detection device comprising a processor and a memory, the memory comprising a set of instructions that, when executed by the processor, cause the fingertip detection device to execute the following operations:

determining a minimum-depth point in a hand area to be detected based on a depth image;

determining a hand vertex in the hand area to be detected based on the depth image;

determining a fingertip position based on the minimum-depth point and the hand vertex;

wherein the determining a fingertip position based on the minimum-depth point and the hand vertex comprises:

if the minimum-depth point and the hand vertex are a same pixel, determining the pixel as the fingertip position;

if the minimum-depth point and the hand vertex are different pixels, determining a vertical-axis distance between the minimum-depth point and the hand vertex in the depth image; determining a depth distance between the minimum-depth point and the hand vertex in the depth image; determining the fingertip position based on the depth distance and the vertical-axis distance.

10. The fingertip detection device of claim 5, wherein the determining the fingertip position based on the depth distance and the vertical-axis distance comprises:

if a difference between the depth distance and the vertical-axis distance is greater than or equal to a distance threshold, determining the minimum-depth point as the fingertip position;

if the difference between the depth distance and the vertical-axis distance is less than the distance threshold, determining the hand vertex as the fingertip position.

11. The fingertip detection device of claim 9, wherein the determining a minimum-depth point in a hand area to be detected based on a depth image comprises:

for each pixel in the hand area to be detected, taking a given area around the pixel as a decision area, and taking the pixel as a central pixel of the decision area;

determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point;

determining a stable point having the minimum depth in the depth image as the minimum-depth point of the hand area to be detected.

12. The fingertip detection device of claim 9, wherein the determining a hand vertex in the hand area to be detected based on the depth image comprises:

for each pixel in the hand area to be detected, taking a given area around the pixel as a decision area, and taking the pixel as a central pixel of the decision area;

determining number of pixels in the decision area whose depth differences from the central pixel are less than a depth difference threshold, and if the number of pixels whose depth differences from the central pixel are less than the depth difference threshold is greater than a quantity threshold, determining the central pixel as a stable point;

determining a stable point having the maximum height in the depth image as the hand vertex of the hand area to be detected.

13. The fingertip detection device of claim 9, wherein before the determining a hand vertex in the hand area to be detected based on the depth image, the method further comprises:

extracting an effective foreground depth map of the hand;

determining the hand vertex in the hand area to be detected based on the effective foreground depth map of the hand.

14. The fingertip detection device of claim 13, wherein the extracting an effective foreground depth map of the hand comprises:

determining, based on the depth image, a plurality of hand depths and a hand volume corresponding to each hand depth;

determining an image interception position and obtaining the effective foreground depth map of the hand according to the determined plurality of hand depths and the hand volume corresponding to each hand depth.

15. The fingertip detection device of claim 14, wherein the determining a plurality of hand depths and a hand volume corresponding to each hand depth comprises:

obtaining, according to a predetermined depth increment, depth sections at a plurality of depth points by using the minimum-depth point as a starting point;

determining, for each depth section, a hand depth corresponding to the depth section and number of pixels in the depth section;

determining the hand volume corresponding to each hand depth based on the number of pixels in each depth section.

16. A non-transitory computer-readable storage medium in which computer-readable instructions are stored, and when the instructions are executed by a computer, executing the following operations:

determining a minimum-depth point in a hand area to be detected based on a depth image;

determining a hand vertex in the hand area to be detected based on the depth image;

determining a fingertip position based on the minimum-depth point and the hand vertex;

wherein the determining a fingertip position based on the minimum-depth point and the hand vertex comprises:

if the minimum-depth point and the hand vertex are a same pixel, determining the pixel as the fingertip position;

if the minimum-depth point and the hand vertex are different pixels, determining a vertical-axis distance between the minimum-depth point and the hand vertex in the depth image; determining a depth distance between the minimum-depth point and the hand vertex in the depth image; determining the fingertip position based on the depth distance and the vertical-axis distance.

* * * * *